United States Patent [19]

Yanagisawa et al.

[11] Patent Number: 5,615,206
[45] Date of Patent: Mar. 25, 1997

[54] OPTICAL DISK

[75] Inventors: Takuma Yanagisawa; Seiichi Ohsawa; Hiroki Kuribayashi, all of Tsurugashima, Japan

[73] Assignee: Pioneer Electronic Corporation, Tokyo, Japan

[21] Appl. No.: 522,543

[22] Filed: Sep. 1, 1995

Related U.S. Application Data

[63] Continuation of Ser. No. 96,982, Jul. 27, 1993, abandoned.

[30] Foreign Application Priority Data

Aug. 5, 1992 [JP] Japan ................................ 4-209152

[51] Int. Cl.⁶ .................................................... G11B 3/70
[52] U.S. Cl. .................................................... 369/284
[58] Field of Search ................................ 369/284, 283, 369/275, 275.1, 100, 275.2, 275.4, 44.41, 44.25

[56] References Cited

U.S. PATENT DOCUMENTS

| | | | |
|---|---|---|---|
| 4,782,477 | 11/1988 | Ichihara et al. | 369/284 |
| 4,984,231 | 1/1991 | Yasuoka et al. | 369/275.2 |
| 5,157,249 | 10/1992 | Hashimoto et al. | 369/44.41 |

FOREIGN PATENT DOCUMENTS

| | | |
|---|---|---|
| 59-215036 | 12/1984 | Japan . |
| 61-90341 | 5/1986 | Japan . |
| 62-250533 | 10/1987 | Japan . |
| 63-175835 | 7/1988 | Japan . |
| 6479954 | 3/1989 | Japan . |
| 3107824 | 5/1991 | Japan . |
| 3104021 | 5/1991 | Japan . |
| 3286433 | 12/1991 | Japan . |
| 4281218 | 10/1992 | Japan . |

*Primary Examiner*—Stuart S. Levy
*Assistant Examiner*—Allen Cao
*Attorney, Agent, or Firm*—Sughrue, Mion, Zinn, Macpeak & Seas

[57] ABSTRACT

Disclosed is an optical disk having rows of pits, corresponding to information signals, formed on a transparent substrate, and a reflective film formed on this substrate. The reflective film is formed of amorphous silicon (a-Si) or indium antimonide (InSb), which exhibits a third-order non-linear optical effect. Thus, the reflectance of the reflective film formed of this material increases nearly in proportion to the intensity of the irradiated beam spot. The beam spot irradiated on the optical disk has the highest intensity at the center portion and this intensity becomes weaker as a point in the spot approaches the edge. Therefore, the effective spot size of the beam spot can be reduced, making it possible to reproduce from the reflection type optical disk information signals with a spatial frequency above the cutoff spatial frequency defined by the reproducing optical system. In other words, a row of pits recorded at a high density can be reproduced. As a change in the reflectance of the reflective film does not alter the structure of the material, the reflective film has a fast response to the reflectance change and is hardly deteriorated by the repetitive change in reflectance.

5 Claims, 2 Drawing Sheets

TRACKING DIRECTION

OPTICAL DISK

This is a Continuation of Application Ser. No. 08/096,982 filed Jul. 27, 1993, now abandoned.

BACKGROUND OF THE INVENTION

1. Field of the Invention

This invention relates to a reflection type optical disk.

2. Description of the Related Art

A reflection type optical disk has an information recording surface on which rows of pits corresponding to information signals are formed as tracks. The signals are reproduced by utilizing the phenomenon that when a reproduction or read beam spot is irradiated on a row of pits, the diffraction by the pits greatly reduces the amount of reflected light. A change in the amount of reflected light, which is obtained when the beam spot passes through the mirror portion and the target pit portion, is converted into an electric signal by a light-receiving unit, thus yielding the corresponding information signal.

For such an optical disk, the signal reproduction resolution is limited mostly by the wavelength k of the light source of the reproducing optical system and the number of apertures, NA, of the objective lens, and the spatial frequency ($2NA/\lambda$)) is the cutoff spatial frequency that defines the limit of information signals. To achieve high density recording of pits on the optical disk, therefore, it is necessary to shorten the wavelength $\lambda$ of the light source of the reproducing optical system (e.g., a semiconductor laser) and to increase the number of apertures, NA, of the objective lens. Due to technical limitation on the improvement of the wavelength of the light source and the number of apertures of the objective lens, however, it is difficult to remarkably improve the recording density.

Under such circumstances, Japanese Patent Laid-open No. 3-292632 discloses an optical disk whose reflective film is formed of a material of which reflectance varies with temperature, such as a thermochromic material or a phase-changeable material, to thereby partially change the reflectance within the read beam spot. This structure can reduce the effective spot size of the read beam spot on the optical disk, allowing the reproduction of a spatial frequency above the cutoff spatial frequency defined by the reproducing optical system.

Since the aforementioned material changes its material structure with a change of its temperature to vary the reflectance, its response speed is generally slow and its repetition characteristic is still poor. Furthermore, it is necessary to perform an erasing operation to return the changed material structure to the initial status.

SUMMARY OF THE INVENTION

With a view to solving the above problems, this invention has been accomplished, and it is a primary object of the present invention to provide a reflection type optical disk which exhibits a quick response to a change in reflectance and an excellent repetition characteristic.

It is another object of the present invention to provide a reflection type optical disk capable of increasing the recording density of pits.

To achieve the foregoing and other objects and in accordance with the purpose of the present invention, a reflection type optical disk according to this invention includes a reflection film formed of a material exhibiting a non-linear optical effect of the third order.

When a read beam spot is irradiated on the reflection type optical disk of this invention, the status of electrons in the reflective film within that beam spot varies in accordance with the light intensity, producing a non-linear optical effect of the third order. As the light intensity of the beam spot increases, therefore, the reflectance increases. In general, as the point of interest gets closer to the center of the beam spot, the beam spot has a stronger light intensity. The distribution of the light intensity of the beam spot of the reflected light over the optical disk becomes greater at the center portion of the beam spot due to a higher reflectance of the beam spot at the center portion, whereas this distribution of the light intensity becomes smaller at the edge portion of the beam spot due to a lower reflectance of the beam spot at the edge portion. That is, the effective spot size of the beam spot can be reduced. It is therefore possible to reproduce information signals with a spatial frequency above the cutoff spatial frequency of the reproducing optical system.

BRIEF DESCRIPTION OF THE DRAWINGS

FIG. 3($b$) is a graph showing the light intensity distribution of the read beam spot of FIG. 3($a$);

FIG. 3($c$) is a graph showing the distribution of the reflectance of the reflective film of FIG. 1; and FIG. 3($d$) is a graph showing the light intensity distribution of the beam spot reflected at the reflective film of FIG. 1.

DETAILED DESCRIPTION OF THE PREFERRED EMBODIMENT

The features of the present invention that are believed to be novel are set forth with particularity in the appended claims. The invention, together with objects and advantages thereof, may best be understood by reference to the following description of the presently preferred embodiment together with the accompanying drawings.

Figure 1:
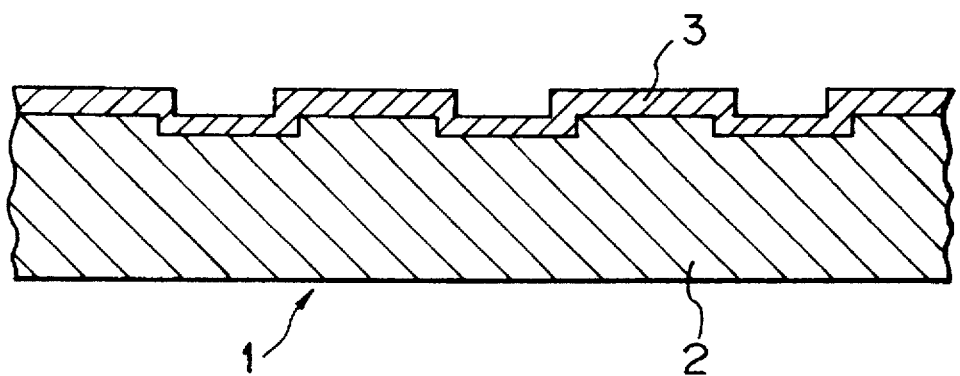
FIG. 1 is a vertical cross sectional view showing one embodiment of a reflection type optical disk according to the present invention.

FIG. 1 illustrates a reflection type optical disk 1 according to the present invention. This optical disk 1 has rows of pits, corresponding to information signals, formed as tracks on a transparent substrate 2, and a reflective film 3 formed on this pits-formed substrate 2.

The reflective film 3 is formed of a third-order non-linear optical material, such as amorphous silicon (a-Si; including the one doped with hydrogen (H) or nitrogen (N)) or indium antimonide (InSb), which exhibits a third-order non-linear optical effect. This third-order non-linear optical effect is one of non-linear optical responses that are observed when a laser beam or the like enters in the material.

The non-linear optical responses of a material are non-linear responses that the electric polarization P of the material shows with respect to a photoelectric field E of the incident wave. The electric polarization P is generally expressed by the following equation.

$$P = X^{(1)}E + X^{(2)}E^2 + X^{(3)}E^3 + \ldots \quad (1)$$

where $X^{(1)}$ is a linear susceptibility, $X^{(1)}$ (i+2,3, ... ) is a non-linear susceptibility. In the equation (1), the first term represents a linear polarization, the second term a second-order non-linear polarization, and the third term a third-order non-linear polarization. The third-order non-linear optical effect utilized in the present invention indicates a non-linear refractive index effect that is a change in the refractive index of a material in proportion to the intensity of the incident wave due to the third-order non-linear polarization of the equation (1). Of non-linear optical materials showing the non-linear optical effect, those which have large values of $X^{(3)}$ (esu) as shown in Table 1 below are used as the material for the reflective film 3.

TABLE 1

| Non-linear Optical Material | $X^{(3)}$ (esu) |
|---|---|
| a-Si | $\sim 10^{-3}$ |
| InSb | $\sim 10^{-4}$ |
| a-As2S$_3$ | $\sim 10^{-4}$ |

Figure 2:
FIG. 2 is a graph for explaining the relation between the intensity of incident light to a reflective film and the reflectance.

Given that the intensity of the incident light is I, the refractive index is n, the linear refractive index is $n_o$ and non-linear refractive index is $n_2$ (cm$^2$/w), the reflectance R when the reflection film 3 exhibits the non-linear refractive index effect is expressed as follows:

$$n_2 = \frac{16\pi^2}{Cn_0^2} X^{(3)} \times 10^7 \text{ (cm}^2\text{/W)} \quad (2)$$

$$n = n_0 + n_2 I \quad (3)$$

$$R = \frac{|n - 1|^2}{|n + 1|^2} \quad (4)$$

where C(cm/s) is the light speed. Thus, a change in the reflectance R of the reflective film 3 with respect to the intensity of the incident wave therein becomes as shown in FIG. 2. That is, the reflectance R for the above-described reflective film 3 increases nearly in proportion to the incident-wave intensity I.

Information reproduction from the reflection type optical disk of this embodiment will be described below.

Figure 3A:
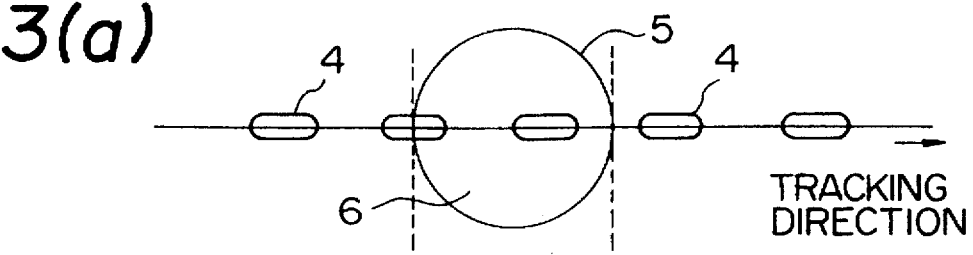
FIG. 3($a$) is a top view showing the optical disk of FIG. 1 when a read beam spot is irradiated on a row of pits on this optical disk.
Figure 3B:
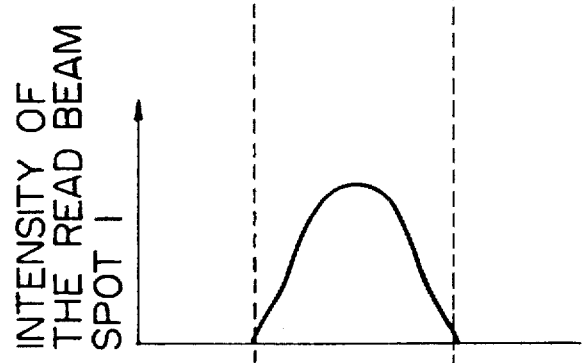
Figure 3C:
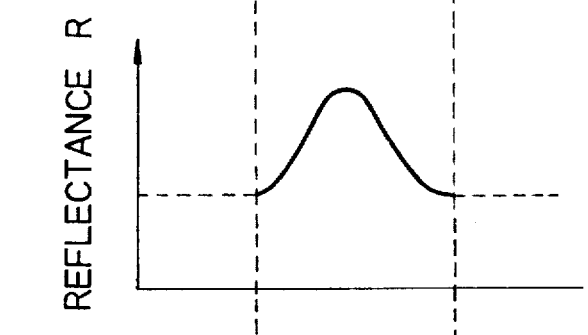
Figure 3D:
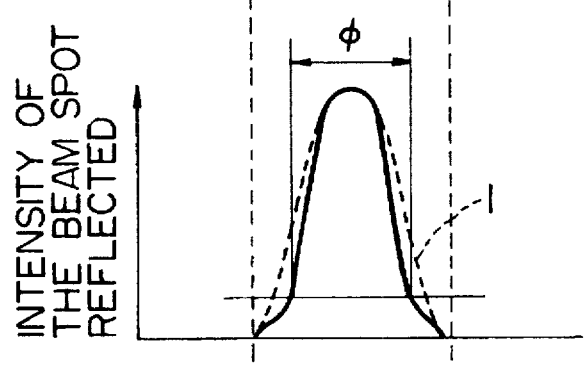

As shown in FIG. 3(a), when a reading beam spot 5 is irradiated on the optical disk 1 on which a row of pits 4 corresponding to information signals are formed, the light intensity I of the beam spot 5 irradiated on the optical disk 1 has a distribution as shown in FIG. 3(b). A third-order non-linear optical effect appears in a beam spot region 6 on the optical disk 1 at this time, and the reflectance R increases in accordance with the light intensity I of the irradiated beam spot 5. Accordingly, the reflectance R in the beam spot region 6 becomes the highest at the center portion of the spot and the lowest at the edge portion of the spot, as shown in FIG. 3(c). The reflected spot reflected by the optical disk 1 therefore has such an intensity distribution that the intensity at the edge portion is considerably weaker than the intensity at the center portion as shown in FIG. 3(d). That is, the effective spot size φ is reduced. The dotted line 1 in FIG. 3(d) indicates the light intensity distribution of the reflected spot when the reflectance is constant. (It should be noted that the light intensity at the center of the spot is the same in order to compare the spot sizes.)

As the effective spot size φ according to the present invention is smaller than that of the conventional beam spot having a uniform reflectance in the beam spot region 6, it is possible to read from the optical disk 1 information signals having a spatial frequency above the cutoff spatial frequency, which is determined by the number of apertures, NA, of the objective lens, and the wavelength λ of the semiconductor laser. In other words, the row of pits 4 recorded at a high density can be reproduced.

A change in the reflectance R of the reflection film 3 is caused by a change in the status of electrons in the material that occurs due to the third-order non-linear optical effect. This phenomenon does not therefore change the material structure, so that the response speed with respect to the reflectance change becomes several tens of nanoseconds or smaller as shown in Table 2 below without carrying out any thermal optimization which is normally needed for a phase-changing material.

TABLE 2

| | Material | Response Time | Repetition Characteristic |
|---|---|---|---|
| Conventional Materials | Thermally phase-changing material | $10^{-3}$–$10^{-8}$ sec | about 10000 times |
| | Thermochromic material | $10^2$–$10^{-9}$ sec | about 20000 times |
| 3rd-order Non-linear Materials | a-Si | $10^2$–$10^{-12}$ sec | infinite |
| | InSb | $10^{-8}$–$10^{-9}$ sec | infinite |

When the beam spot region 6 on the optical disk 1 moves away, the electron status of the reflective film 3 returns to the original status and the reflectance R also returns to the initial value. The recovery time is on the order of several tens of nanoseconds or below. It is therefore unnecessary to perform an erasing operation to recover the reflectance R, eliminating the need for any device which performs erasure. This can contribute to reducing the required number of components of an optical disk player. Further, as the material structure of the reflective film 3 is unchangeable, this optical disk shows an excellent characteristic of the repetitive change in reflectance, thus preventing the reflective film from being deteriorated by the repetitive change in reflectance.

If the a-Si film in the above-described embodiment is doped with hydrogen (H) or nitrogen (N), the same advantage would be obtained.

In short, according to the reflection type optical disk of the present invention, the reflective film is formed of a material that shows a third-order non-linear optical effect, the reflectance of the reflective film increases nearly in proportion to the intensity of the beam spot irradiated on the optical disk. The effective spot size of the beam spot can therefore be reduced, making it possible to reproduce information signals with a spatial frequency above the cutoff spatial frequency limited by the reproducing optical system. In other words, a row of pits recorded at a high density can be reproduced. As a change in the reflectance of the reflective film is caused by a change in the status of electrons that occurs due to the third-order non-linear optical effect, the response speed can be improved to thereby prevent the reflective film from being deteriorated by the repetitive change in reflectance.

What is claimed is:

1. A reflection type optical disk for recording information signals comprising:

a substrate having a major surface and a plurality of pits formed on the major surface, said plurality of pits corresponding to the information signals, said information signals being read out by detecting a variation due to individual one of said plurality of pits a light intensity of an incident beam which has been reflected with the optical disk, said optical disk further comprising;

a reflective layer formed on the said major surface with covering the plurality of pits, said reflective layer consisting of a third order, non-linear optical effect material producing a non-linear refractive index effect, said reflective layer producing a non-linear optical effect to develop a following electric polarization P in response to the incident beam impinging thereon, $$P + X^{(1)}E + X^{(2)}E^2 + X^{(3)}E^3 + \ldots$$

where E is a photoelectric field E of the incident beam, $X^{(1)}$ is a linear susceptibility, and $X^{(i)}$ (i =2, 3, ..., unit:esu) is an i-th order non-linear susceptibility said reflective layer having the third order non-linear susceptibility $X^{(3)}$ more than $1 \times 10^{-4}$ value, wherein said reflective layer having a reflectivity which generally changes linearly with the light intensity of the incident beam thereon wherein when the incident beam irradiates the major surface to make a beam spot in focus on the major surface, the light intensity distribution of the incident beam causes a reflectance of the reflective layer within the beam spot to take the different levels in accordance with the luminance at respective points in the beam in a manner that the level of the reflectance of a center portion is higher than the level of the reflectance of a periphery portion around the center portion in the spot, therein an effective beam spot size of the incident beam reflected from the reflective layer for reading the information signals become smaller than the spot size of the incident beam irradiating the major surface.

2. The reflection type optical disk according to claim 1, wherein said reflective layer is formed of amorphous silicon.

3. The reflection type optical disk according to claim 1, wherein said reflective layer is formed of amorphous silicon doped with hydrogen.

4. The reflection type optical disk according to claim 1, wherein said reflective layer is formed of amorphous silicon doped with nitrogen.

5. The reflection type optical disk according to claim 1, wherein said reflective layer is formed of indium antimonide.

* * * * *

UNITED STATES PATENT AND TRADEMARK OFFICE
CERTIFICATE OF CORRECTION

PATENT NO. : 5,615,206
DATED : March 25, 1997
INVENTOR(S) : T. Yanagisawa et al

It is certified that error appears in the above-indentified patent and that said Letters Patent is hereby corrected as shown below:

Column 4, line 67, after "pits", and insert --in--.

Column 5, line 12, delete "$P+X^{(1)}E+X^{(2)}E^2+X^{(3)}E^3+...$", and insert --$P=X^{(1)}E+X^{(2)}E^2+X^{(3)}E^3+...$--.

Column 5, line 15, delete "$X^{(t)}$", and insert --$X^{(1)}$--.

Column 5, line 19, delete "value".

Signed and Sealed this

Sixteenth Day of September, 1997

Attest:

BRUCE LEHMAN

Attesting Officer

Commissioner of Patents and Trademarks